(12) United States Patent
Conger

(10) Patent No.: US 12,355,391 B2
(45) Date of Patent: Jul. 8, 2025

(54) SOLAR PANEL SUPPORT SYSTEMS INCLUDING MOVEABLE SINGLE AXIS TRACKER SUPPORTS

(71) Applicant: P4P Holdings, LLC, Carbondale, CO (US)

(72) Inventor: Steven J. Conger, Carbondale, CO (US)

(73) Assignee: P4P Holdings, LLC, Carbondale, CO (US)

( * ) Notice: Subject to any disclaimer, the term of this patent is extended or adjusted under 35 U.S.C. 154(b) by 0 days.

(21) Appl. No.: 17/354,127

(22) Filed: Jun. 22, 2021

(65) Prior Publication Data
US 2022/0407450 A1    Dec. 22, 2022

(51) Int. Cl.
*H02S 20/32* (2014.01)

(52) U.S. Cl.
CPC .................... *H02S 20/32* (2014.12)

(58) Field of Classification Search
CPC ......... H02S 20/32; F24S 30/20; F24S 30/425; F24S 30/455; F24S 50/20; A01G 9/243
See application file for complete search history.

(56) References Cited

U.S. PATENT DOCUMENTS

| | | | |
|---|---|---|---|
| 4,466,423 A * | 8/1984 | Dolan | F24S 25/50 353/3 |
| 9,564,851 B2 | 2/2017 | Conger | |
| 2010/0018520 A1 * | 1/2010 | Prueitt | F24S 30/425 126/694 |
| 2014/0116421 A1 * | 5/2014 | Clair | F24S 30/20 126/714 |
| 2016/0329858 A1 * | 11/2016 | Stoddard | F24S 30/45 |
| 2018/0083568 A1 * | 3/2018 | Guha | F24S 23/82 |
| 2020/0059193 A1 * | 2/2020 | Sgarrella | H02S 20/32 |
| 2020/0173229 A1 * | 6/2020 | Ahmed | H02S 30/10 |
| 2020/0252027 A1 * | 8/2020 | Nagai | H02S 20/32 |
| 2020/0295701 A1 * | 9/2020 | Spedini | F24S 30/425 |
| 2021/0199347 A1 * | 7/2021 | Bao | F24S 50/20 |
| 2021/0336579 A1 * | 10/2021 | Sun | F24S 30/42 |
| 2024/0235462 A1 * | 7/2024 | Fisher | H02S 20/32 |

FOREIGN PATENT DOCUMENTS

| | | | | |
|---|---|---|---|---|
| FR | 3077463 A1 * | 8/2019 | ......... | A01G 13/0206 |
| WO | WO-2006130892 A1 * | 12/2000 | ............. | F24J 2/5241 |

OTHER PUBLICATIONS

FR-3077463-A1 English machine translation (Year: 2019).*
WO-2006130892-A1 English machine translation (Year: 2006).*

* cited by examiner

*Primary Examiner* — Andrew J Golden
(74) *Attorney, Agent, or Firm* — Berg Hill Greenleaf Ruscitti LLP

(57) ABSTRACT

The invention comprises embodiments of structural supports for solar panels installed within solar arrays. Some of the embodiments include a combination of cable and truss supports, and others include truss supports rigidly mounted to columns. Other embodiments include single axis tracker devices for mounting solar panels within a solar array of an installation. The devices can be roller mounted for selective horizontal displacement of the mounted solar panels at any desired location within the installation. The density or number of devices can also be adjusted within the installation to provide precise control of sunlight or shade for underlying vegetation.

4 Claims, 15 Drawing Sheets

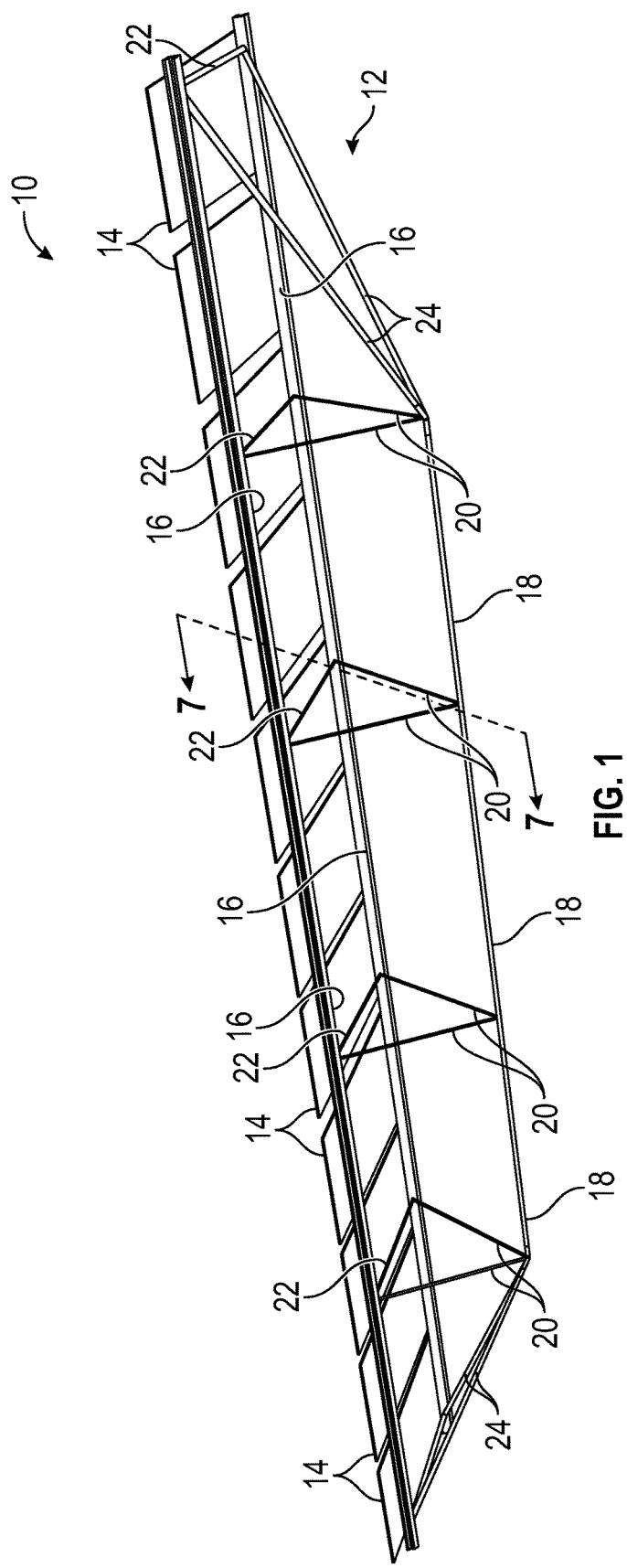

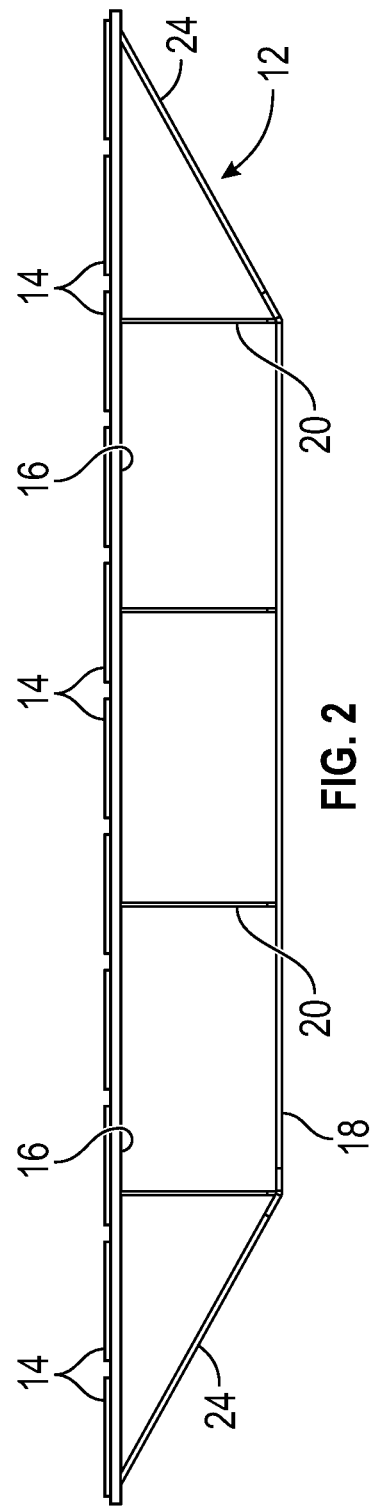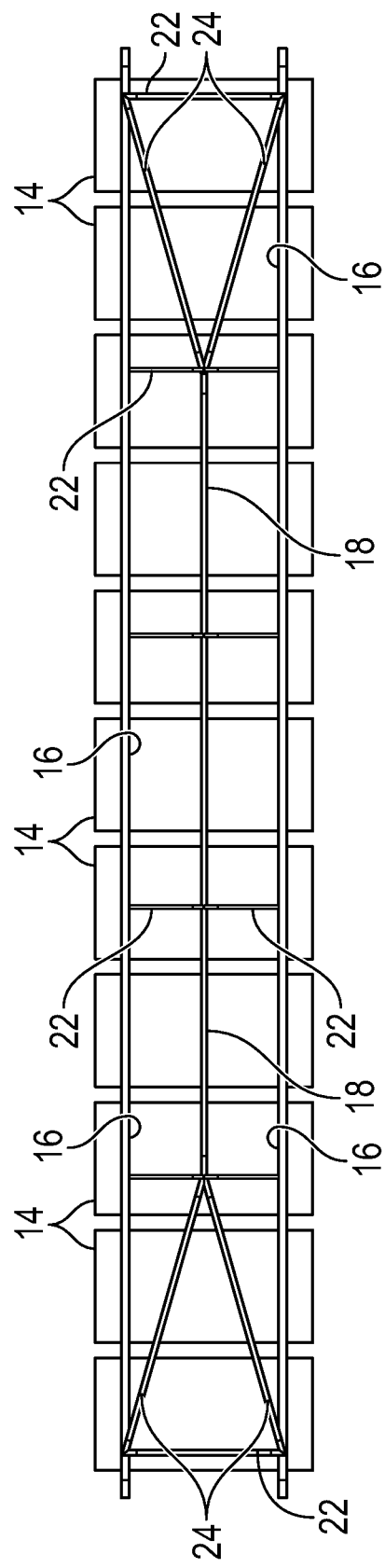

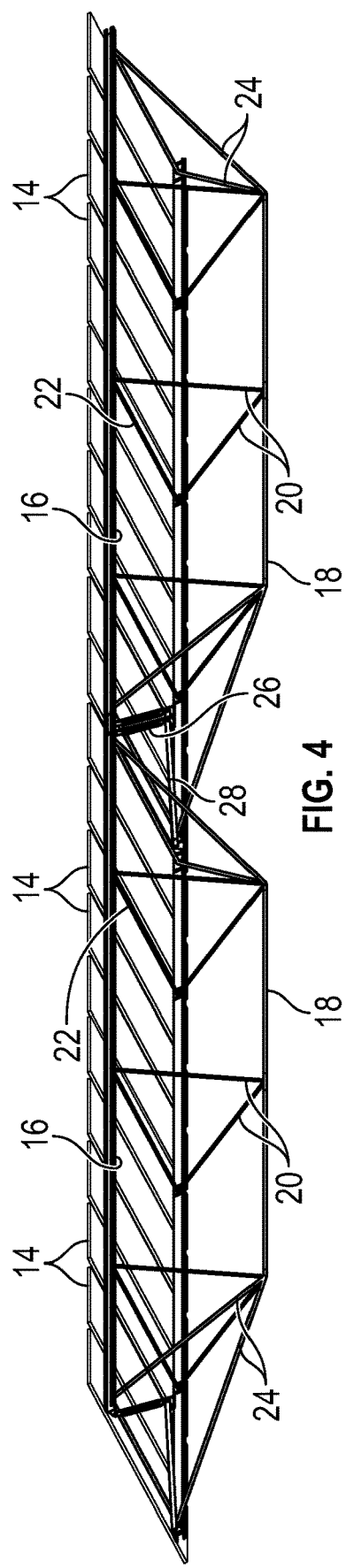
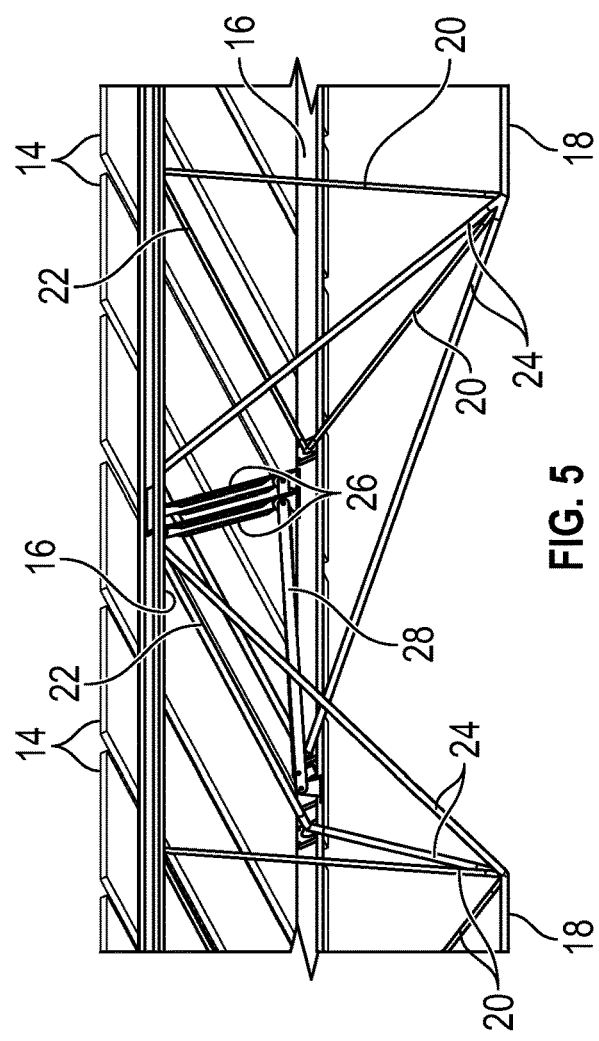

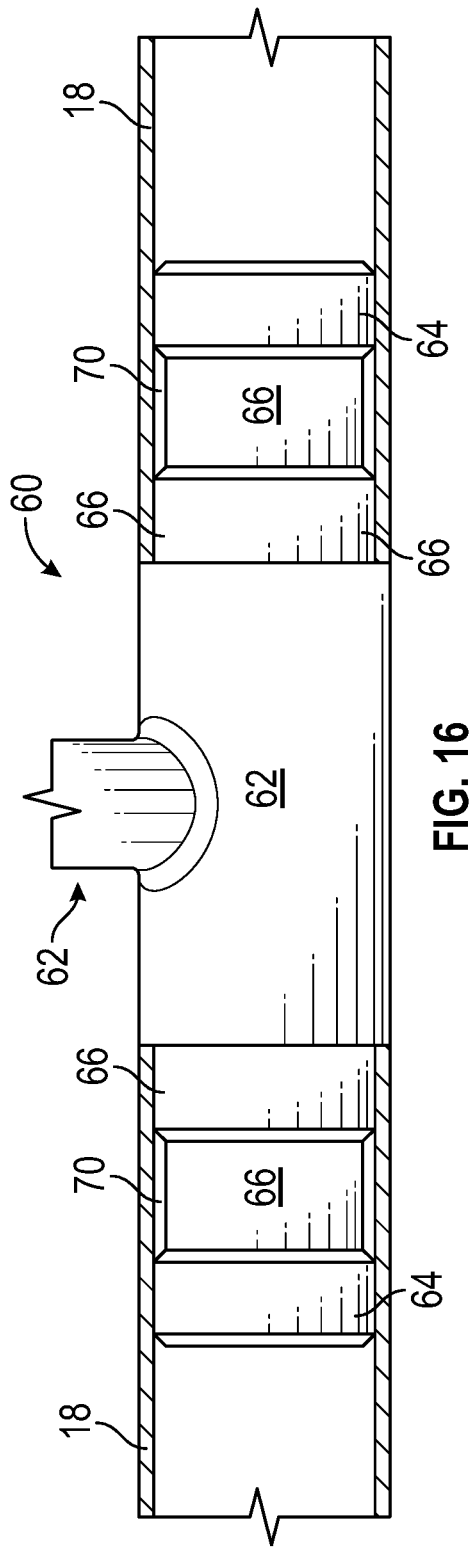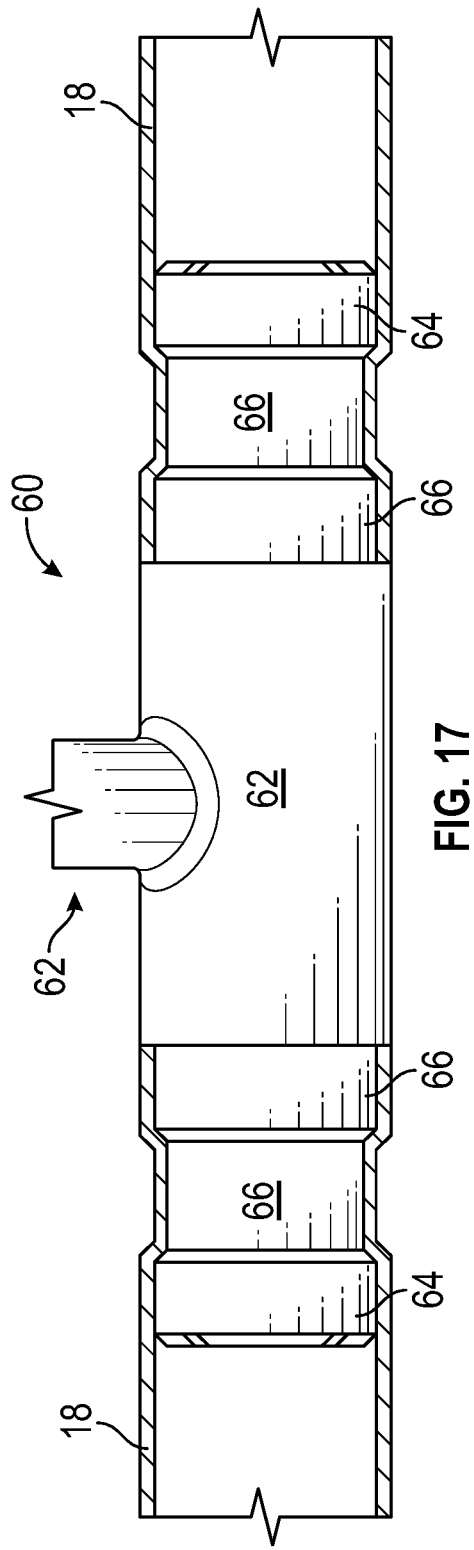

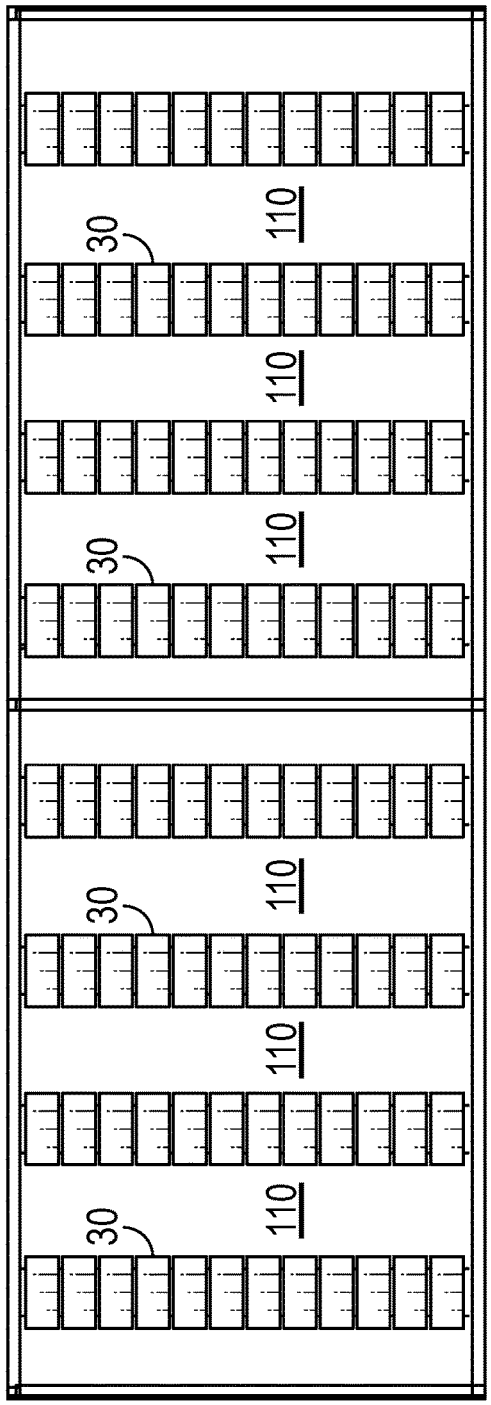
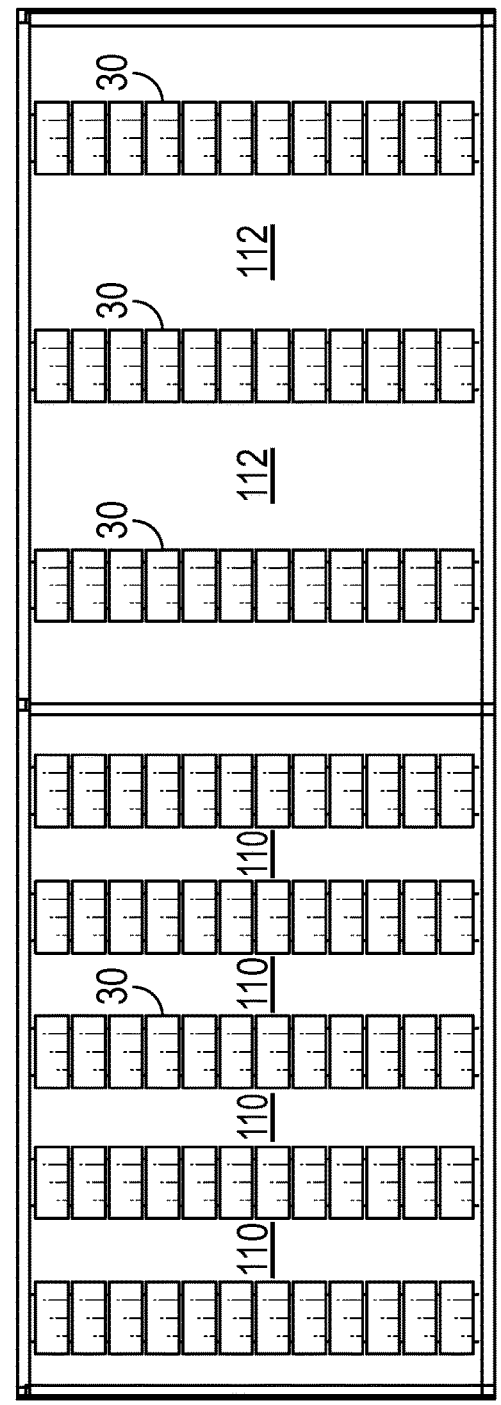
FIG. 29
FIG. 30

SOLAR PANEL SUPPORT SYSTEMS INCLUDING MOVEABLE SINGLE AXIS TRACKER SUPPORTS

FIELD OF THE INVENTION

The invention relates to the field of devices and systems that capture solar energy including photovoltaic (PV) solar panels supported by the system of cables and columns, and more particularly, to a solar panel support system that incorporates single axis tracker supports for mounted solar panels that may be selectively positioned to optimize the sewer capture and shade or sunlight for underlying vegetation.

BACKGROUND OF THE INVENTION

Many existing systems to support PV panels require a vast amount of steel/iron support thereby making such systems expensive, difficult to install in remote locations, and for the requiring significant equipment and manpower for installation and maintenance. Further, such existing systems require large amounts of open space and therefore cannot be installed applications where there is very little land-use available. In terms of cost, because of the amount of steel/iron supports required along with installation and maintenance costs, PV panels of this type are not economically viable because the extended amount of time required to offset the installation and maintenance costs as compared to the electrical power generated.

In order to reduce installation and maintenance costs, some PV panel support systems have been developed that minimize the amount of steel required and also have been designed to be mounted over existing structures. However, even for these improved PV panel support systems, many of them have drawbacks because they are static, immovable structures that cannot be modified to adapt to changing sunlight conditions as the seasons pass. Further, these support systems cannot be automatically controlled to adjust the amount of sunlight passing through the system to underlying vegetation. Accordingly, these support systems are not well adapted for installation over agricultural areas.

There number of patent references that disclose use of simplified PV panel support systems by use of arrangement of cables, posts and anchors. One group of patents include those by Steven Conger, such as the U.S. Pat. No. 9,564,851 of the group. These patent references disclose a great many PV support structures, each comprising a combination of cable supports, post supports, and anchors.

Improvements continued to be made in photovoltaic (PV) technology that increases the efficiency of photovoltaic cells in their capability to convert solar energy to electrical energy. In general, the size of individual PV cells is reduced yet their capacity is increased for converting solar energy. Despite the advancements made in PV technology, PV support structures still primarily use conventional construction designs that utilize heavy metallic frame structures that are mounted to the ground with a substantial number of support posts and anchors per PV panel.

One reason that PV supports still maintain heavy support structures is to ensure that the PV panels are capable of withstanding live loads such as wind and snow loading. A single high wind occurrence or a heavy snowfall could potentially damage a many PV panels within a solar panel array. Such damage could certainly hinder any potential economic advantage of using solar power as opposed to traditional electrical power. Accordingly, in many ways, PV support structures are designed with extensive structural support.

SUMMARY OF THE INVENTION

According to the invention, the invention includes a solar panel support system that, in one particular embodiment, incorporates single axis tracker for mounting of solar panels that may be selectively positioned to optimize the solar capture by rotating the solar panels to optimize the angular incidence of sunlight striking the PV panels.

According to another embodiment, in addition providing the angular adjustment of the PV panels, the PV panels may be moved horizontally to optimize the amount of shade or sunlight for underlying vegetation. According to this horizontal displacement capability, a solar panel array may be populated with the desired number of PV panels to cover a designated area, and further, the panels may be horizontally shifted to increase or decrease the number of panels covering the designated area.

Also, according to the invention, embodiments of the invention include support structures for mounting the PV panels. Some of the embodiments include a combination of cable supports, posts, and anchors. Other embodiments include only rigid supports without cables. Other of the embodiments may include truss supports that are used in combination with cables or with rigid supports.

The term "pod" as used herein defines a support structure that holds one or more PV panels. The pod may be considered a unit in that a pod may be easily added or removed from a group of solar panels within a particular installation.

The terms "solar panel array" or "PV array" as used herein defines a plurality of pods that are grouped together to form a larger group or cluster of PV panels for a particular site or installation.

The figures herein illustrate planar or flat PV panels, which is the most common configuration for PV panels. However, it should be understood that the figures herein that show the PV panels are not restricted to any particular construction to include shape or geometric configuration. For example, the pods illustrated herein show rectangular shaped groups of PV panels within a pod, but it should be understood that the group of PV panels within a pod is not restricted to a rectangular shape and could be any other shape such as circular, triangular, or others.

According to embodiments of the invention that enable selected PV panels/pods to be moved horizontally within a PV array, the horizontal movement may be manually controlled or automatically controlled. According to either method, a set of tracks are mounted on horizontal support members, and the pods are mounted on the tracks, such as by rollers that engage in the tracks. Wherever there is a set of tracks available for shifting the horizontal position of the pods, the pods may be so displaced to optimize shade or sunlight for the underlying ground, or to take advantage of other factors such as the slope of the terrain over which the PV array is installed.

With respect to embodiments of the invention that allow the pods to be manually displaced in the horizontal direction, each pod may be mounted to a set of rollers, and some means provided on the underside of the pods which enable a user to push or pull the pods along a desired track in the direction of desire displacement.

According to one embodiment, it is contemplated that the tracks of a solar array are arranged in a linear, parallel arrangement so that the pods mounted to the tracks may be selectively shifted along any point of the length of the track to which it is mounted.

According to another embodiment, it is contemplated that the tracks the solar array may be arranged in a non-linear arrangement, or at an angled arrangement so that the pods may be located over specific locations of the ground. For example, one portion or section of a solar array may be mounted on a flat, horizontal surface while another portion of the parade may be mounted over a sloping surface, or a service which has a protruding obstacle that must be avoided. In these cases, having the ability to selectively shift the pods linearly and non-linearly provides more options to an installer for selecting a location for installation of a greater number of solar panels.

According to various embodiments of the invention, the system for supporting the PV array may include a plurality of vertical columns or posts. Support cables are secured between the vertical columns. Additional support to the vertical columns may be provided by anchor lines that are strung between the vertical columns and the ground. Various types of anchors may be used to secure the anchor lines to the ground. For example, the anchors could be concrete footers, metallic straight shaft grouted anchors, post grouted ground anchors, underreamed anchors, soil nails, and others.

The pods are selectively mounted to the cables, thereby being suspended above the ground. The particular height of any column may be selected so that the plurality of cables secured to the columns may be at a desired height and a desired angularity with respect to the ground.

According to another aspect of the invention, to be described in greater detail, the invention may be considered a single axis tracker device especially adapted for use with a solar panel array of an installation, said device comprising: a base; a rocker support connected to the base; a motor mounted to the rocker support, a motor shaft communicating with said motor and rotatably driven by said motor; a first solar panel mounted to one end of said motor shaft; a second solar panel mounted to an opposite end of said motor shaft; and a clamp assembly integral with said base for clamping said single axis tracker device to a cable; a roller communicating with said clamp assembly for engaging the cable enabling the single axis tracker device to be selectively and controllably moved horizontally across the cable.

According to yet another aspect of the invention, to be described in greater detail, the invention may be considered a method of selectively and controllably displacing solar panels across a solar array of an installation, comprising: providing a solar panel support structure spaced from the ground at a desired height; providing at least one single axis tracker mounted to said support structure, said single axis tracker including means for selectively displacing said single axis tracker horizontally across said solar panel support structure, said at least one single axis tracker having at least one solar panel mounted thereto; providing at least a pair of columns for supporting the solar panel support structure to the ground; determining locations where the solar panels are to be located within the solar array of the installation; and moving said at least one single axis tracker along said solar panel support structure by at least one roller to the determined locations.

Further aspects of this second aspect of the invention may include wherein:

the moving step is achieved by said at least one roller being rolled along a cable of said solar panel support structure; or wherein the moving step is achieved by said at least one roller being rolled along a rail of said solar panel support structure.

According to yet another aspect of the invention, to be described in greater detail, the invention may be considered a compression fit connector especially adapted for interconnecting tubular members of a truss assembly, comprising: at least two connector extensions; each connector extension having an end section and at least one intermediate section, said end section having a larger diameter than said at least one intermediate section; and wherein respective tubular members are fitted over each said connector extension and covering said end sections and intermediate sections, such that said tubular members are swaged fitted over said connector extensions causing said tubular members to be crimped in contact with said intermediate sections.

Other features and advantages of the invention will become apparent from a review of the following figures, taken in conjunction with the detailed description and claims.

BRIEF DESCRIPTION OF THE DRAWINGS

FIG. 1 is a perspective view of a solar panel or PV pod having a truss support structure;

FIG. 2 is a side elevation view of the pod of FIG. 1;

FIG. 3 is a bottom plan view of the pod of FIG. 1;

FIG. 4 is a perspective view of two PV pods connected end-to-end, each pod adopting similar truss support structures shown from FIG. 1;

FIG. 5 is an enlarged fragmentary perspective view of FIG. 4 showing the area where the pods connect one another;

FIG. 16 is a cross-sectional view of one example of a precast connector used to connect to opposing truss members;

FIG. 17 is a cross-sectional view of FIG. 9 illustrating connection of the truss members after a swaging operation;

FIG. 29 is a plan view of FIG. 27 showing the single axis trackers arranged in the substantially uniform spacing; and FIG. 30 is a plan view of FIG. 28 showing the single axis trackers arranged in the non-uniform spacing.

DETAILED DESCRIPTION

Figure 6:
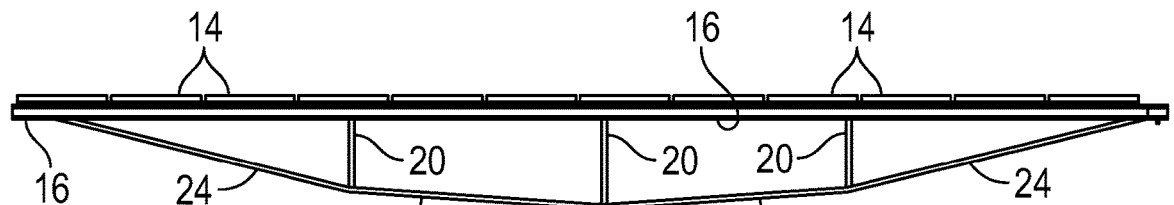
FIG. 6 is a perspective view of another embodiment of a solar panel or PV pod having a modified truss support structure.

FIG. 1 illustrates a solar panel support structure or pod 10 according to a first embodiment of the invention relating to a pod. The pod 10 can be made a part of a larger PV array in which the array can incorporate not only the particular pod 10 but may incorporate other support structures for stabilizing the mounting of PV panels. In this embodiment, the pod 10 comprises a pair of upper main horizontal supports 16, a lower main horizontal support 18, and a plurality of vertically oriented compression members 20. The main horizontal supports 16 extend substantially parallel with one another and are spaced from one another at a desired distance to accommodate the particular dimension of the solar panels 14 mounted thereto. The opposite ends of the solar panels 14 may slightly extend beyond the respective supports 16. Each end of the pod 10 may terminate with a pair of diagonally extending compression members 24. The vertically oriented members 20 may have a first end connected to a horizontal support 16 and the other end connected to the lower main support 18. Transfer stability can be further enhanced with the provision of one or more horizontal truss members 22 which extend between the pair of upper main supports 16 as shown. Each of the supports and members of the pod can be, for example, made from tubular steel.

FIG. 2 is a side elevation view of the pod of FIG. 1. This figure highlights the simplicity of the pod construction, yet also displays the dimensional stability of the particular design.

FIG. 3 is a bottom plan view of the pod of FIG. 1. This figure further illustrates the geometrical arrangement of the support members along with the arrangement of mounted solar panels 14. Although each of the solar panels 14 are shown as being of the same dimension, it should be understood that the pod 10 is not limited to solar panels of identical sizes, nor is the pod 10 limited to uniform spacing between solar panels.

The pod 10 represents a structurally stable yet simplified construction that may provide adequate support for the mounted solar panels 14. However as explained further below with respect to other embodiments, the particular arrangement of support members can be modified based on installation requirements.

FIG. 4 is a perspective view of two PV pods 10 connected end-to-end according to another embodiment of the invention, each pod adopting similar truss support structures shown from FIG. 1. FIG. 5 is an enlarged fragmentary perspective view of FIG. 4 showing the area where the pods connect one another. As shown in this enlarged figure, the end-to-end connection between pods may be achieved with interconnected lateral supports or lateral pod connection stiffeners 26. These stiffeners may be installed at the junction or intersection point between the abutting ends of the pods 10. Optionally, one or more additional transverse supports 28 may be provided as shown to further stabilize pod connections.

FIG. 6 is a perspective view of another embodiment of the invention showing a solar panel or PV pod having a modified truss support structure. In this embodiment, the diagonal truss members 24 are illustrated as having longer lengths, while there may be fewer vertical compression members 20. The purpose of this illustration is simply to show that a basic design is set forth in FIG. 1 may be modified by shortening or extending the lengths of various truss members in which lengthening one truss member may allow fewer other truss members to be used. The figure also illustrates the adaptability of the simplified truss construction.

Figure 7:
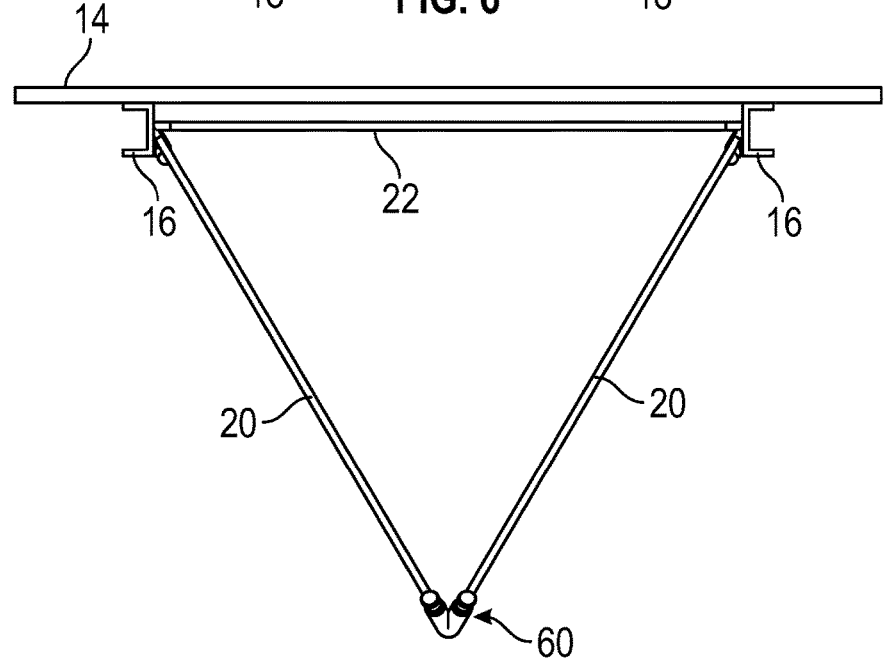
FIG. 7 is a vertical cross-section taken along line 7-7 of FIG. 1 showing construction details of the pod.

FIG. 7 is a vertical cross-section taken along line 7-7 of FIG. 1 showing construction details of the pod. As shown, the pod construction is symmetrical about a vertical axis extending upwards from the connection point of the truss members 20, which join one another at the lower main support 18. This figure also shows that the upper main supports 16 can be channel shaped.

Figure 8:
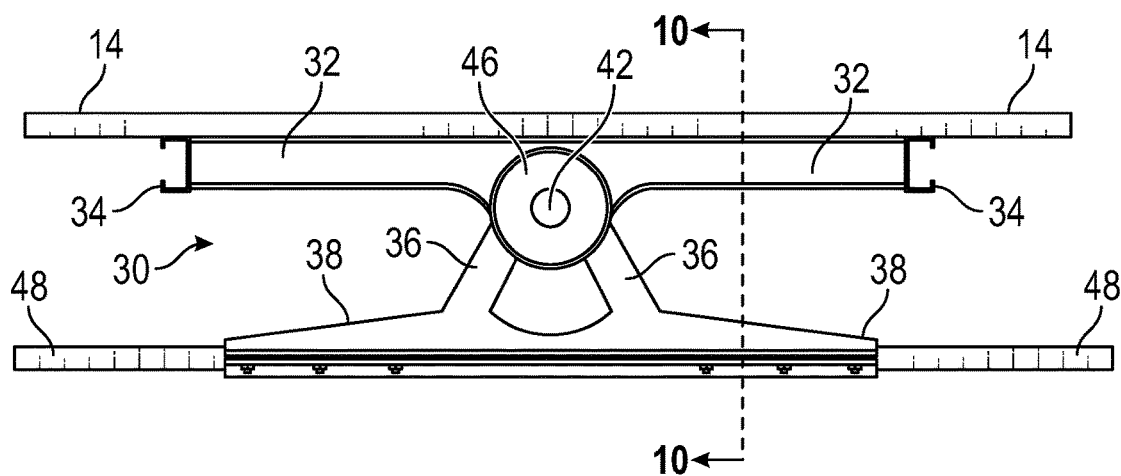
FIG. 8 is a side elevation view of a single axis tracker secured to a support cable, and the single axis tracker having a PV panel mounted thereto.

FIG. 8 is a side elevation view of a single axis tracker 30 in accordance with yet another embodiment of the invention, the single axis tracker 30 secured to a support cable 48, and the tracker having a PV panel 14 mounted thereto. The single axis tracker 30 according to embodiments of the invention allows the mounted PV panels 14 to be rotated about a center axis, thereby denoting the single axis tracking capability. More specifically, the tracker 30 has a base 38 secured to the cable, a rocker support 36 is extending upward from the base 38, and an upper longitudinal support beam 32 that supports the mounted PV panel 14. As shown, the beam 32 extend substantially parallel with the cable 48.

Upper transfers support beams 34 provide transfers support for the mounted PV panel. The panel 14 as mounted to the beams 32 and 34 together rotate about shaft 42 which defines the axis of rotation for the tracker 30. Surrounding the shaft 42 is a bearing assembly 46 which allows smooth and controlled rotation of the panel 14.

Figure 9:
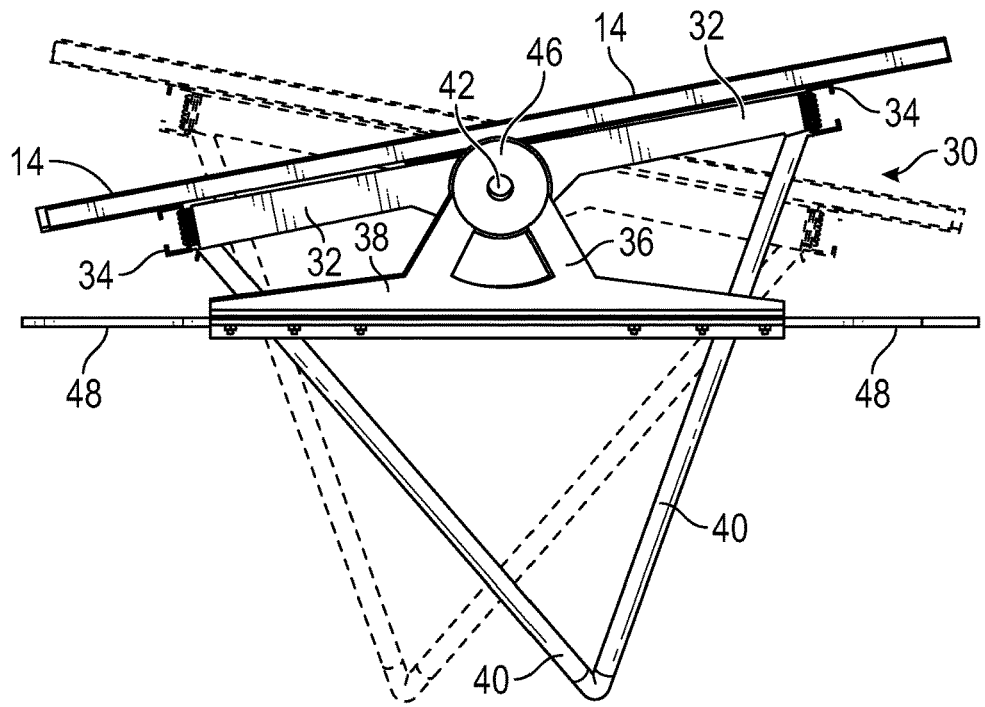
FIG. 9 is another side elevation view of a single axis tracker of FIG. 8 showing how the tracker can be rotated to adjust the incident angle of sunlight striking the PV panel.

FIG. 9 is another side elevation view of a single axis tracker 30 of FIG. 8 showing how the tracker can be rotated to adjust the incident angle of sunlight striking the PV panel. Also shown in this figure are truss member supports 40 that can be associated with any truss support structure which mounts a plurality of solar panels within a pod. In this respect, it is apparent that the entire pod is rotated with the single axis tracker.

It should be understood that while a single cable 48 shown for mounting of the single axis tracker, it is also contemplated that the single axis tracker could be mounted to two or more support cables installed side-by-side so additional lateral stability could be provided for the pod. Further, as discussed with other embodiments of the invention, the single axis tracker 30 is not limited to mounting on a cable but can also be mounted on rigid support structures of a pod that do not use cables.

Figure 10:
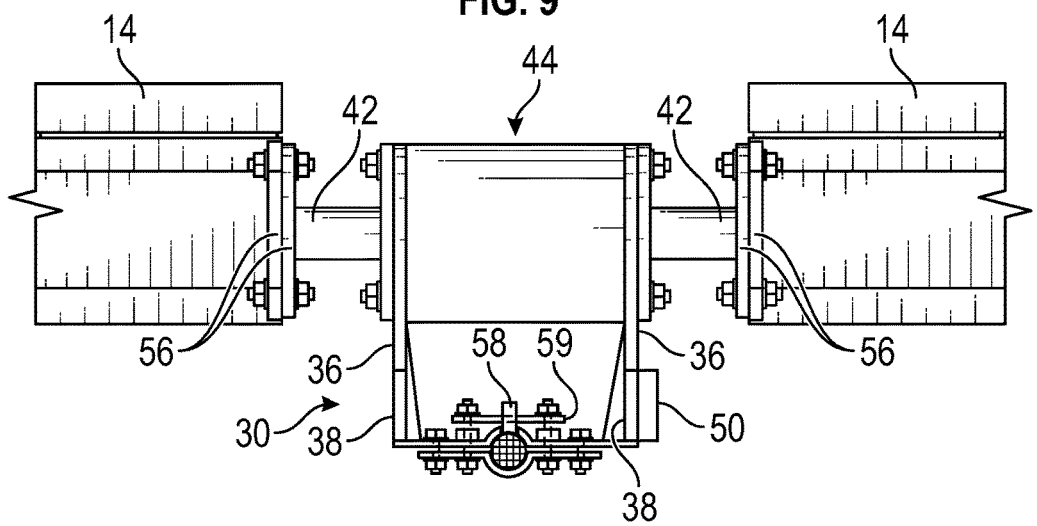
FIG. 10 is an elevation view taken along line 10-10 of FIG. 8 showing further details of the single axis tracker including the motor assembly that causes rotation of the mounted PV panels.

FIG. 10 is an elevation view taken along line 10-10 of FIG. 8 showing further details of the single axis tracker 30 including a motor assembly 44 that causes rotation of the mounted PV panels 14. The motor assembly 44 is mounted between the rocker supports 36. The motor assembly 44 has a motor shaft 42 that extends beyond both ends of the motor housing. Respective solar panels 14 are secured to each end of the motor shaft 42 as by bolted connection plates 56. Control module 50 represents a motor control for the motor assembly 44 to selectively rotate the solar panels 14 to a desired inclination. Control module may allow for either a wired or wireless control of the motor assembly 44, and the control module being in communication with a remote computer system which is capable of tracking the location and inclination of each tracker 30 within a solar array. Accordingly, the intent of control module 50 is to enable for remote control of the motor assembly 44 from a remote location.

Figure 11:
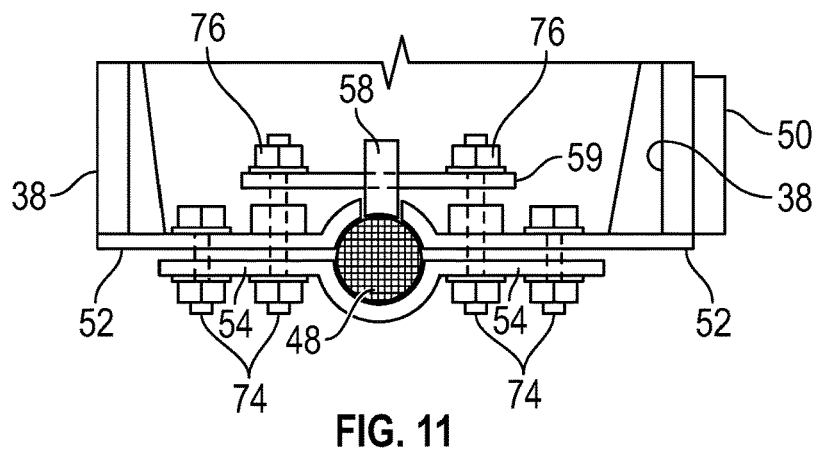
FIG. 11 is an enlarged fragmentary portion of FIG. 10 showing details of the connection of the single axis tracker to the support cable including a roller integrated with the single axis tracker so that it can be selectively moved horizontally along the support cable.

FIG. 11 is an enlarged fragmentary portion of FIG. 10 showing details of the connection of the single axis tracker 30 to the support cable 48 including a roller 58 integrated with the single axis tracker so that it can be selectively moved horizontally along the support cable 48. According to the details shown in this figure, the tracker 30 is secured to the support cable 48 by the base plate 52 of the tracker which, along with a lower clamp plate 54, clamps and holds the tracker by a plurality of bolt and nut combinations 74. When it is desired to move the tracker along the cable 48, the bolt/nut combinations 74 are loosened enabling the lower clamp plate 54 to release compression against the abutting base plate 52. The roller 58 is engaged with the cable 48 and is held in contact against the cable 48 by adjustment of a support rod 59 that extends through the roller 58 and ensures that the full weight of the tracker 30 is applied to the cable 48 by the roller 58. The adjusted position of the support rod 59 is facilitated by adjustment of the upper nuts 76 which also engage corresponding nuts of the combinations 74. The support rod 59 has openings at opposite ends thereof to receive the nuts. To place the tracker in a position for a moment, the nuts 76 are tightened thereby causing the roller 58 to traverse in a downward direction, also causing the cable 48 to clear from contact with the interior surface of the clamp portion of the base plate 52. In this position, all of the weight of the tracker 30 is applied to the cable 48 by the roller 58. The tracker is then horizontally displaced at the desired location within the installation. Although this figure illustrates one roller 58, is contemplated that the tracker 30 may incorporate additional rollers 58 in order to distribute weight of the tracker along other points thereby easing the force necessary to displace the tracker along the cable.

Figure 12:
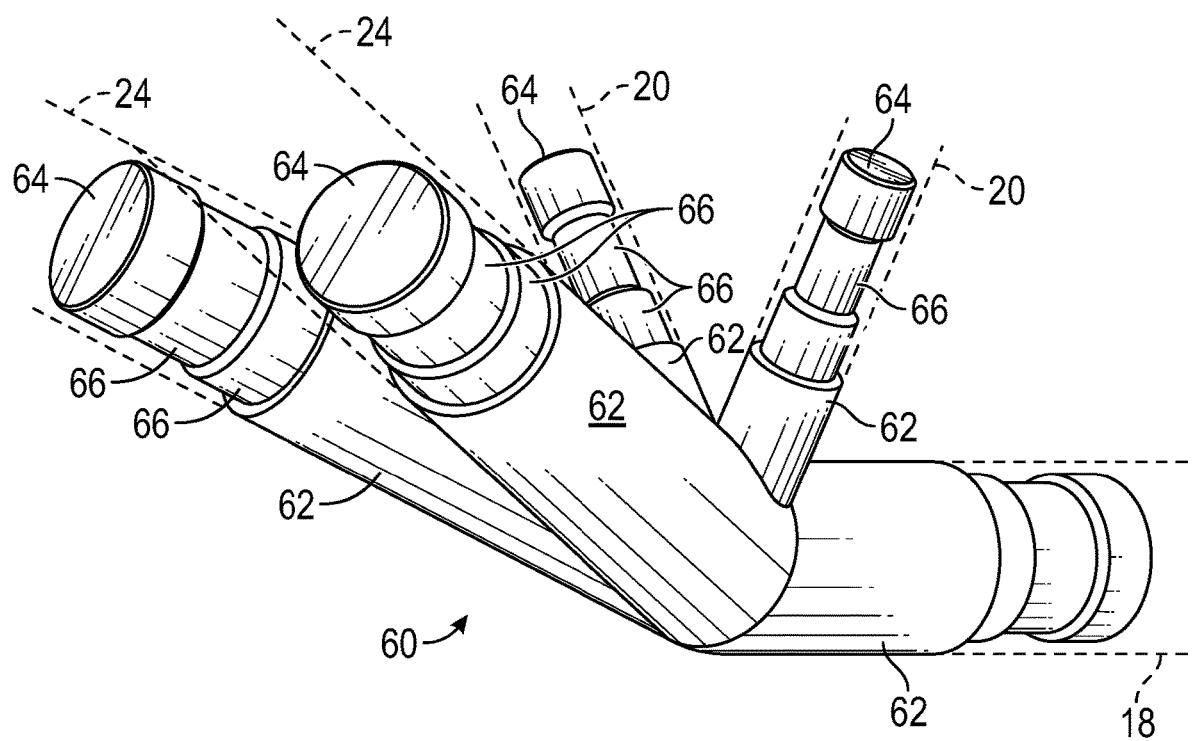
FIG. 12 is a perspective view of a preconfigured or precast connector that may be used to assemble members of a truss support structure.

FIG. 12 is a perspective view of a preconfigured or precast connector 60 according to yet another embodiment of the invention. The connector 60 may be used to assemble members of a truss support structure of tubular construction. This particular example shows a precast connector that can be used, for example, for interconnecting members of the truss structure of FIG. 1 including the diagonal members 24, the vertical members 20, and the lower main support 18. The particular connector of 12 therefore has five distinct connector extensions or connector arms 62 that are geometrically aligned with the truss members connected at that point. Each of the connector extensions 62 include end sections 64 and two intermediate sections 66 that are of a smaller diameter as compared to the body of the connectors and the end sections 64.

Figure 13:
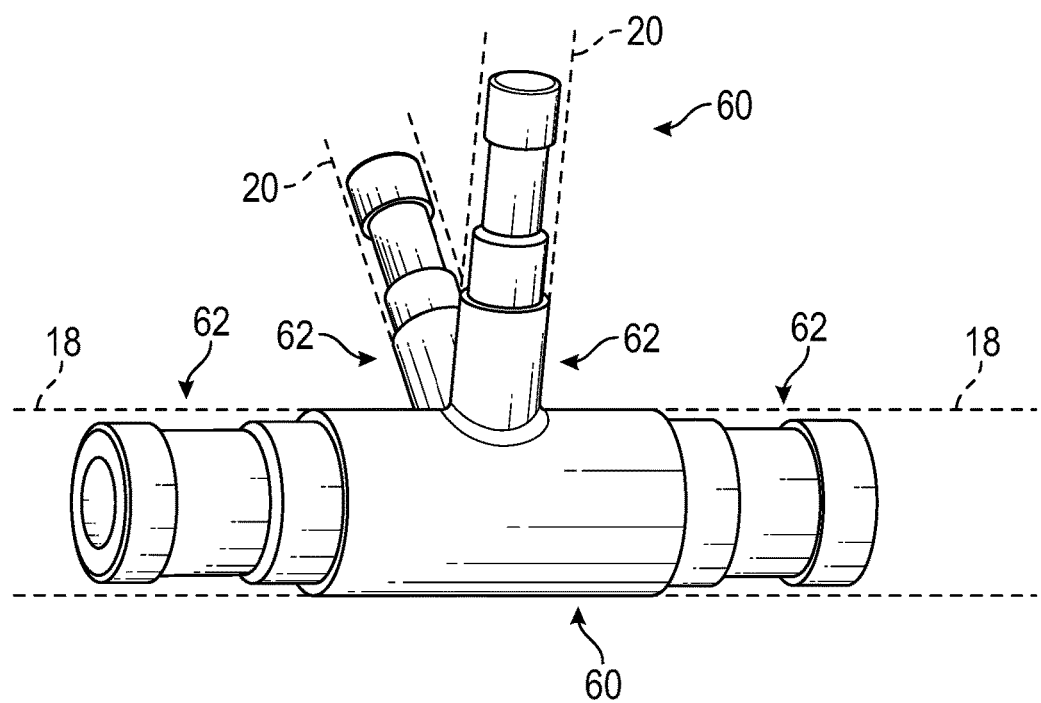
FIGS. 13-15 are perspective views of other precast connectors for assembly of truss members of a truss support structure.
Figure 14:
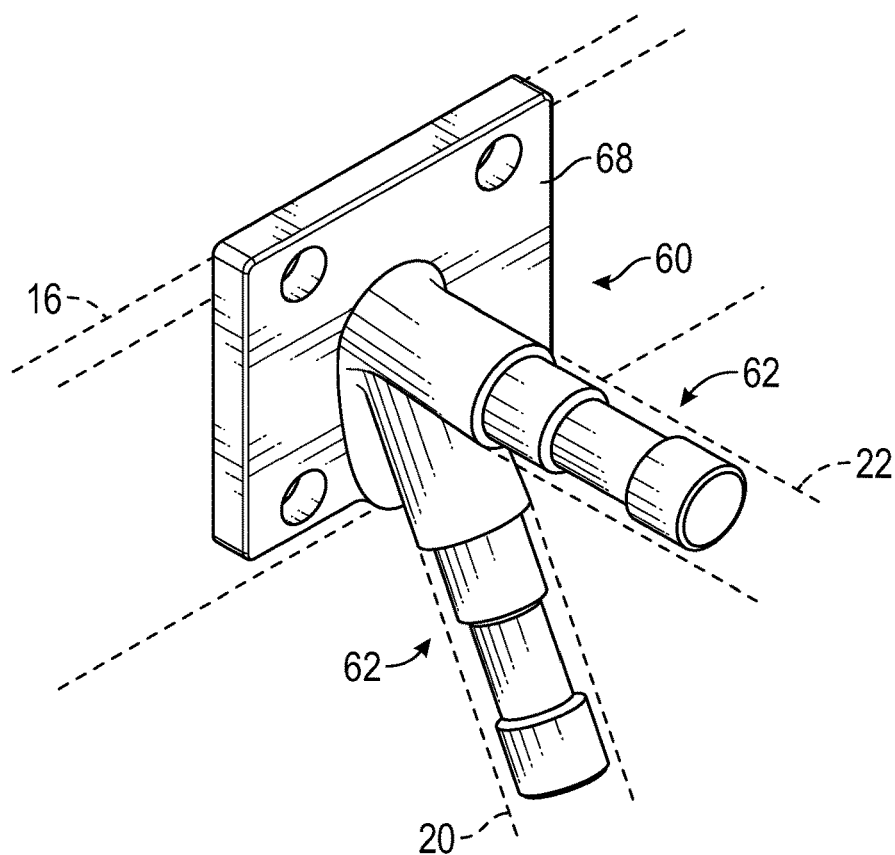
Figure 15:
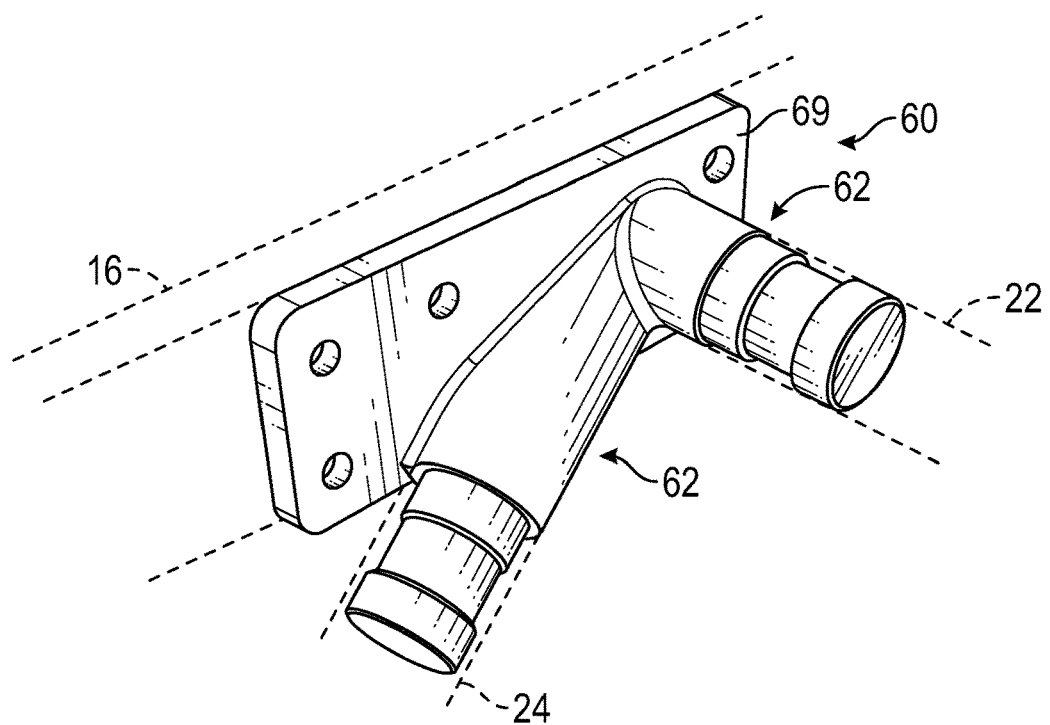

FIGS. 13-15 are perspective views of other precast connectors 60 for assembly of truss members of a truss support structure. Each of these figures illustrate other configurations of the connectors 64 use in connecting other points where truss members intersect. More specifically, FIG. 13 shows for connector extensions which interconnects two vertical truss members 20 and interconnects adjacent ends of main lower supports 18. FIG. 14 more specifically illustrates a connector 60 with two connector extensions 62, supplemented with a gusset plate 68 which therefore enables the connector to interconnect a vertical truss member 20 and a horizontal truss member 22. FIG. 15 more specifically illustrates a connector 60 with two connector extensions 62, supplemented with another gusset plate 69 which therefore enables the connector to interconnect an upper support 16, a horizontal truss member 22, and a diagonal truss member 24.

FIG. 16 is a cross-sectional view of one configuration of the connector 16 used to interconnect adjacent ends of two main lower supports 18. The ends of the supports 18 are placed over the end sections 64 and intermediate sections 66. The intermediate section 66 having the smaller diameter therefore presents a gap 70 between the section 66 and the interior surface of the lower main support 18. FIG. 17 is a cross-sectional view of FIG. 16 illustrating crimping of the truss members 18 after a swaging operation. As shown, a secure connection is created by the swaging operation in which the truss members 18 are collapsed around the gaps to therefore contact the intermediate sections 66, thus creating a swaged connection. Each of the other configurations of the connectors 60 may be operated in the same manner by swaging in order to create swaged connections.

Figure 18:
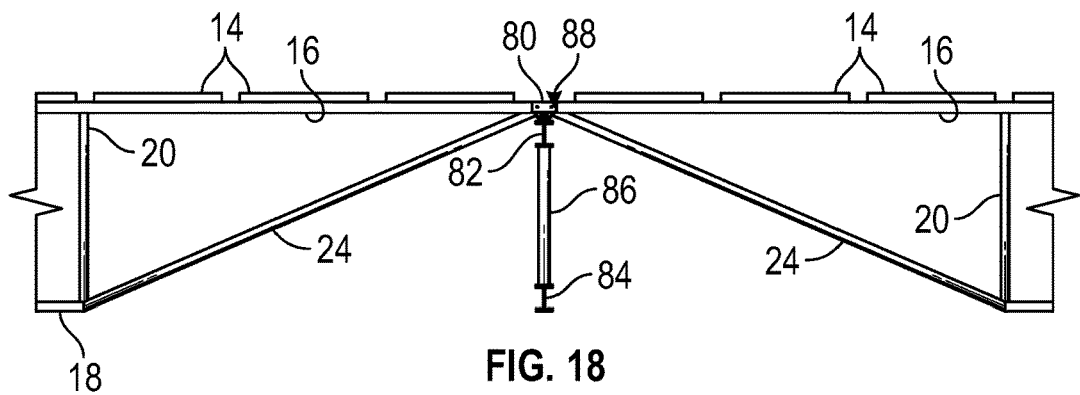
FIG. 18 is a fragmentary end elevation view of a connection between two PV pods in which the pods are roller mounted enabling the pods to be selectively moved horizontally.
Figure 19:
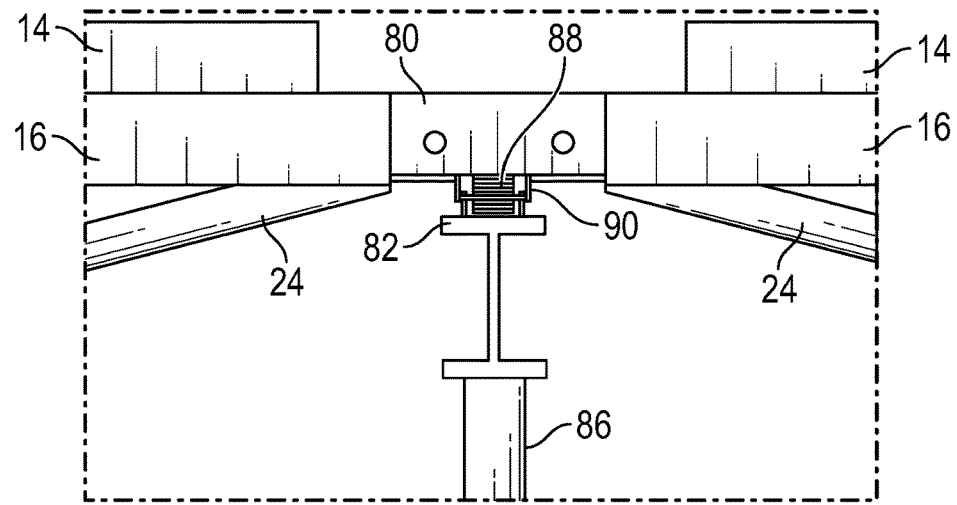
FIG. 19 is an enlarged portion of FIG. 18 showing the roller mounted connection for the pods.

FIG. 18 is a fragmentary end elevation view of a connection between two PV pods in accordance with yet another embodiment of the invention. As shown, the pods are roller mounted enabling the pods to be selectively moved horizontally within an installation. FIG. 19 is an enlarged portion of FIG. 18 showing the roller mounted connection for the pods. As shown in these figures, adjacent ends of two aligned pods are shown as being connected as by a bearing plate 80. The bearing plate 80 rests upon a robust roller 88. The roller 88 is aligned over upper support beam 82 which extends in a lateral or horizontal direction across a solar array of an installation. Supporting frame 90 extends above the support beam 82 in order to keep the roller 88 aligned in contact with the upper surface of the upper beam 82. The upper beam 82 itself is mounted upon column 86/100, this column representing any vertical support within a solar array, which can include a vertical column located on the interior of a solar array, or on the exterior edges of the solar array, depending upon the particular configuration of the pods installed. According to the views of these figures, the two pods are therefore capable of movement together into or out of the page. FIGS. 18 and 19 therefore represent an embodiment of the invention in which truss mounted solar panels are capable of being moved laterally/horizontally combining an integral rolling movement capability. Means can be provided to displace the pods manually or automatically to the desired location.

Figure 20:
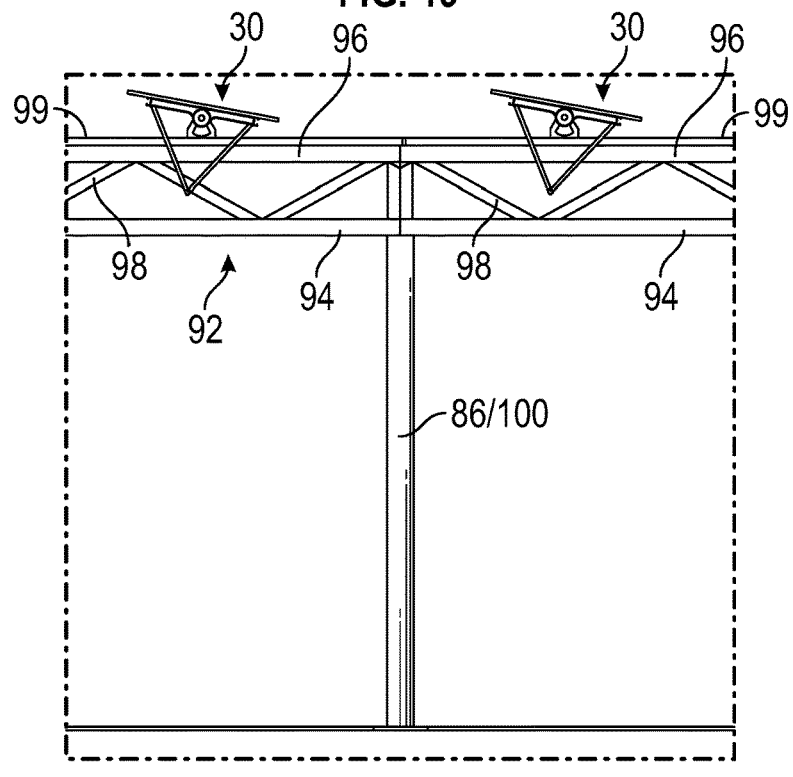
FIG. 20 is a side elevation view showing single axis trackers mounted to a rail supported by a rigid truss support structure, wherein the single axis trackers are moveable horizontally along the rail for selective placement of the single axis trackers.

FIG. 20 is a side elevation view of yet another embodiment of the invention, showing single axis trackers mounted to a rail supported by a rigid truss support structure, wherein the single axis trackers are moveable laterally/horizontally along the rail for selective placement of the single axis trackers within a solar array. Therefore, this figure represents yet another method of selectively displacing solar panels within an installation, also combining the capability with single axis tracking as solar panels may be supported by a rigid support structure. The support structure is shown generally as a truss 92 comprising a lower beam or cord 94, and upper beam or cord 96, and a plurality of web members 98. It should be understood however that this embodiment is not limited to any particular truss structure; therefore, the other truss structures shown in the other embodiments can also be incorporated. A continuous rail 99 is mounted to the upper surface of the upper cord 96. This rail provides a pathway for movement of one or more trackers 30 mounted thereto. The trackers 30 may incorporate integral rollers, similar to the embodiment of FIG. 10, but modified as necessary to allow the roller to be rail mounted, thus eliminating the structure required for clamping support against a cable. For example, the trackers 30 of FIG. 20 could incorporate a robust roller assembly that is mounted to the base plate 52, thus eliminating the need for the lower clamp plate 54 and the associated nut/bolt combinations 74 and 76.

Figure 21:
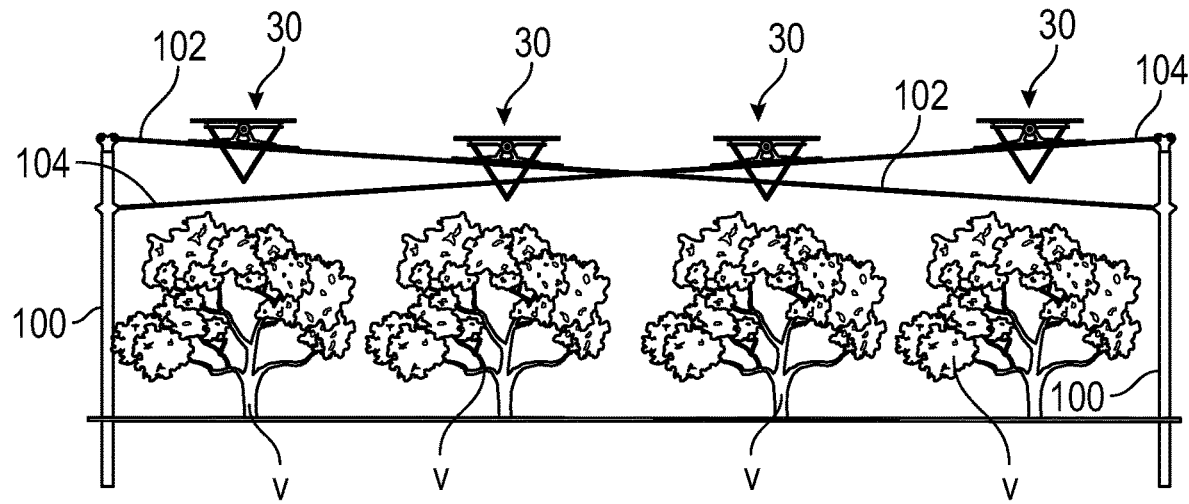
FIG. 21 is a simplified side elevation view of single axis trackers mounted on support cables illustrating one rotational position of the trackers.

FIG. 21 is a simplified side elevation view of another embodiment of the invention with single axis trackers mounted on support cables illustrating one rotational position of the trackers. One purpose of this figure is to illustrate the single axis trackers 30 in simplified mounting arrangements on support cables 102 and 104 connected to columns 100, and the relationship of the trackers with respect to underlying vegetation V. As one should appreciate, the trackers 30 can be located along exact desired locations over the vegetation V resulting in a specified density of solar panels over a given area. Greater or fewer numbers of trackers may be installed to increase or decrease the density. The density of solar panels present directly relates to the amount of sunlight or shade that covers the area under the array. It is therefore contemplated that an installation can be designed so that the desired ratio of sunlight and shade is provided to the underlying vegetation at discrete locations. Another concept that is capable of being provided by the present invention is a uniform or non-uniform spacing of the trackers within a solar array. For example, one section of land under a solar array may require greater or lesser amounts of sunlight in which case, the specific locations of the trackers can be positioned so that sunlight is controlled at discrete locations of land under the solar array.

Figure 22:
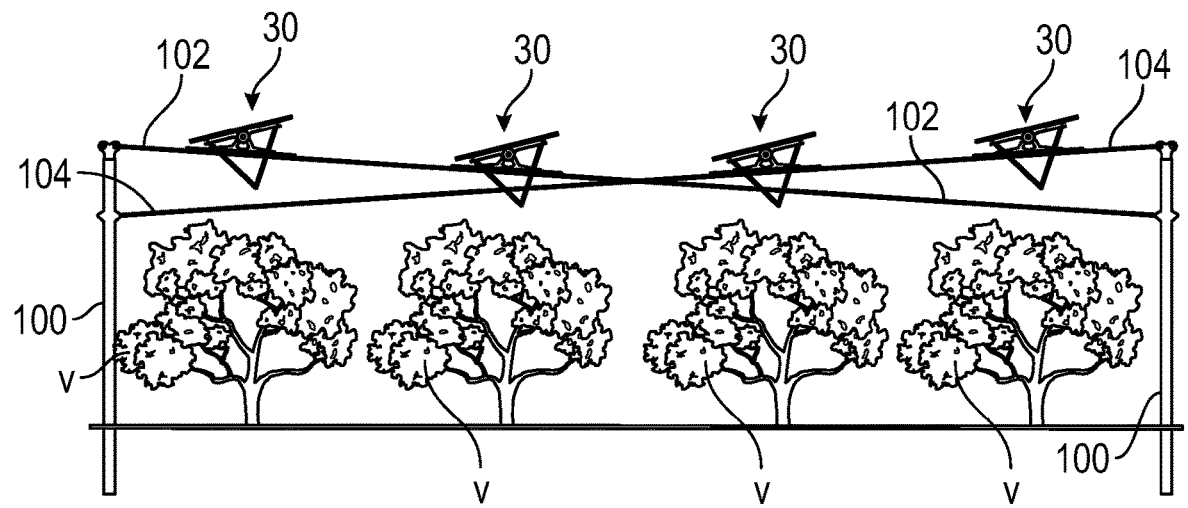
FIG. 22 is the simplified side elevation view of FIG. 21 showing the single axis trackers at another rotational position.

FIG. 22 is the simplified side elevation view of FIG. 21 showing the single axis trackers at another rotational position, thus emphasizing the ability of the single axis trackers to maximize the incident angle with the sun's rays for maximum electrical output.

Figure 23:
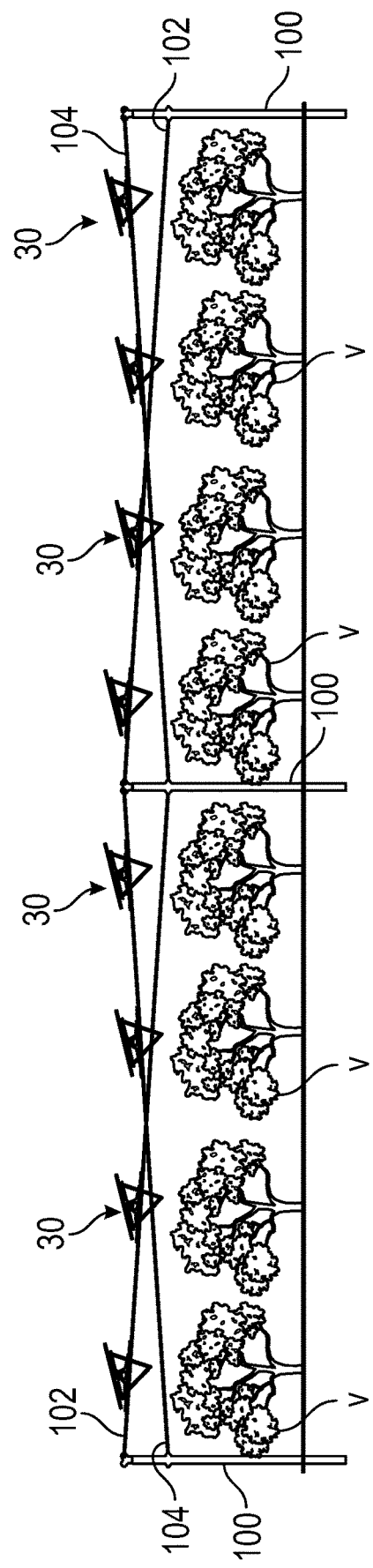
FIG. 23 is another simplified side elevation view of single axis trackers mounted on support cables of an extended length solar panel installation including an intermediate center column.

FIG. 23 is another simplified side elevation view another embodiment of the invention with single axis trackers mounted on support cables 102/104 of a solar array having an extended length. Accordingly, an intermediate center column 100 is provided for additional support.

Figure 24:
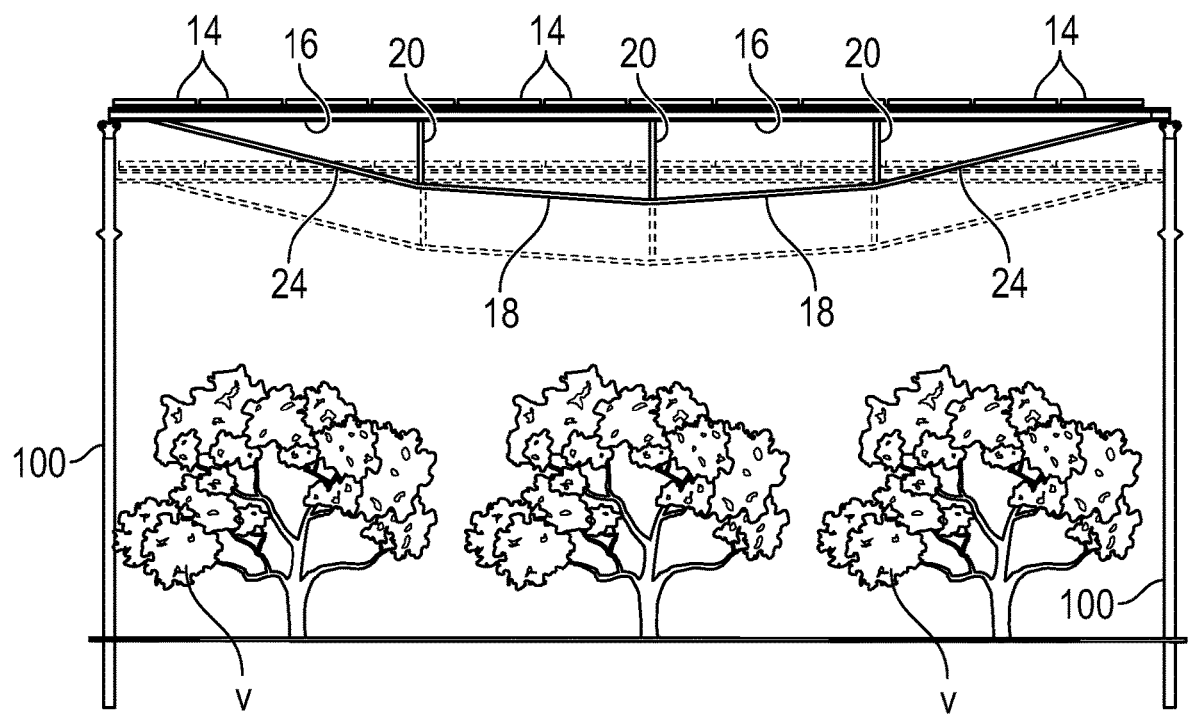
FIG. 24 is yet another simplified side elevation view showing a rigid truss support structure and PV panels mounted directly to the truss, this Fig. further illustrating that the rigid truss support structure can be mounted at various heights above underlying vegetation.

FIG. 24 is yet another simplified side elevation view of another embodiment of the invention, showing a rigid truss support structure and PV panels 14 mounted directly to the truss. This particular figure further illustrates that a rigid truss support structure can be mounted at various heights above underlying vegetation, another selected height of the truss shown in broken lines.

Figure 25:
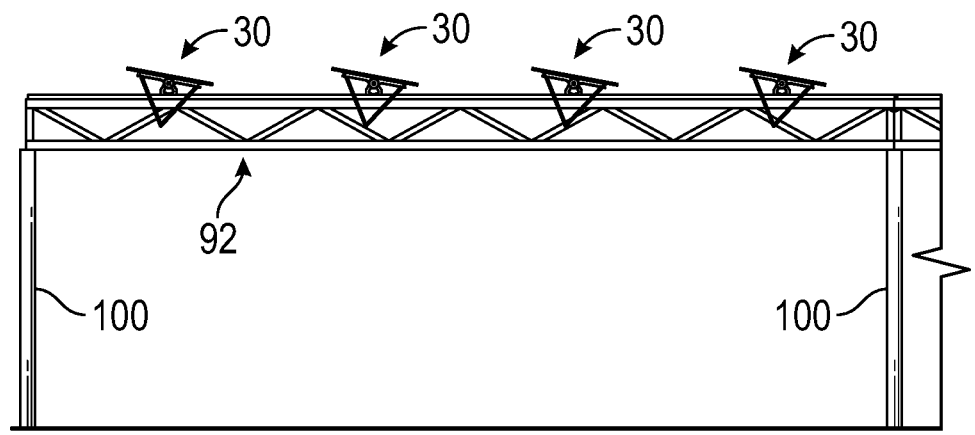
FIG. 25 is yet another simplified side elevation view showing a rigid truss support structure with single axis trackers mounted to a rail supported by the rigid truss support structure, similar to what is shown in FIG. 20, and further illustrating a span of the rigid truss support structure between two columns.

FIG. 25 is yet another simplified side elevation view of another embodiment of the invention showing a rigid truss support structure with single axis trackers 30 mounted to a rail supported by the rigid truss support structure, similar to the rail mounted trackers shown in FIG. 20, and further illustrating a span of the rigid truss support structure between two columns 100.

Figure 26:
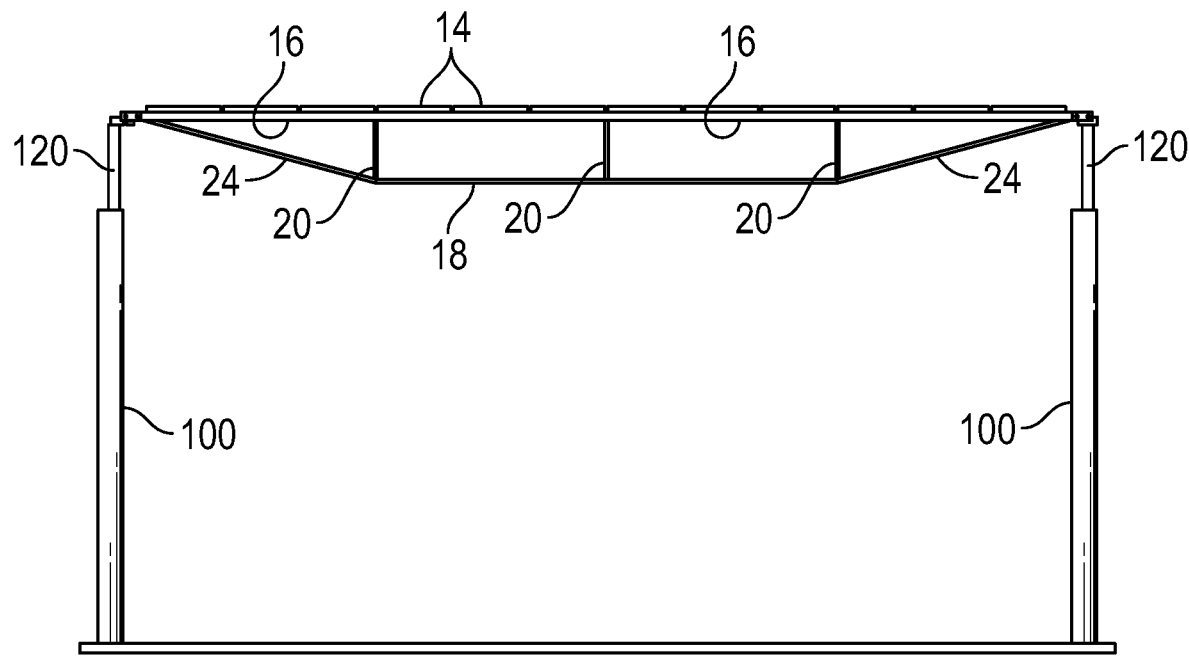
FIG. 26 is yet another simplified side elevation view showing a rigid truss support structure, similar to what is shown in FIG. 24, and further illustrating a span of the rigid truss support structure between two columns wherein the columns have a height adjustment capability.

FIG. 26 is yet another simplified side elevation view of another embodiment of the invention showing a rigid truss support structure, similar to what is shown in FIG. 24, and further illustrating a span of the rigid truss support structure between two columns 100 wherein the columns have a height adjustment capability. The height adjustment capability is shown by column extensions 120 that may be raised or lowered. Locking means can be provided (not shown) to lock the height of the columns in place after adjustment.

Figure 27:
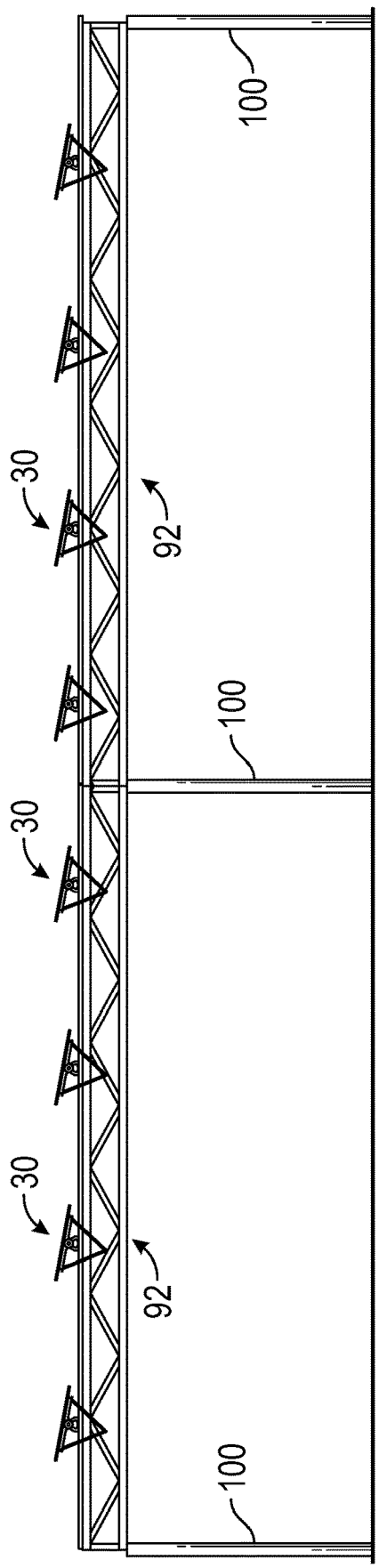
FIG. 27 is yet another simplified side elevation view showing two end-to-end rigid truss support structures with rail mounted single axis trackers, wherein the single axis trackers are arranged with substantially uniform spacing between one another.

FIG. 27 is yet another simplified side elevation view of another embodiment of the invention showing two end-to-end rigid truss support structures with rail mounted single axis trackers 30, wherein the single axis trackers are arranged with substantially uniform spacing between one another.

Figure 28:
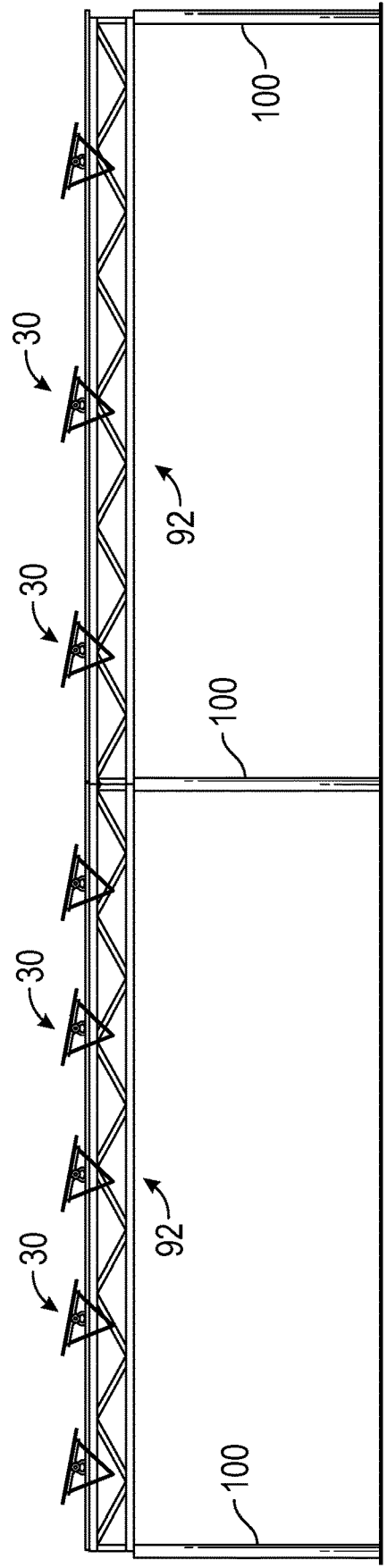
FIG. 28 is the simplified side elevation view of FIG. 27 but showing the single axis trackers being arranged with non-uniform spacing, thereby changing the density of single axis trackers within the solar panel installation.

FIG. 28 is the simplified side elevation view of FIG. 27 but showing the single axis trackers 30 being arranged with non-uniform spacing, thereby changing the density of single axis trackers within the solar panel installation. As discussed, it is advantageous to have the capability to not only adjust the total number of solar panels within a solar array, but also the spacing of the solar panels within the array to address needs regarding sunlight or shade for underlying vegetation at discrete locations.

FIG. 29 is a plan view of FIG. 27 showing the single axis trackers arranged in the substantially uniform spacing. As illustrated, the trackers carrying the solar panels are spaced substantially uniformly from one another, as defined by gaps 110 between the respective groups of trackers.

FIG. 30 is a plan view of FIG. 28 showing the single axis trackers arranged in the non-uniform spacing. Uniform spacing between groups of trackers is shown on the left side of the array, as defined by the gaps 110. Non-uniform or different spacing however is achieved on the right side of the array, as defined by the gaps 112.

While the present invention is set forth herein with respect to many embodiments, it shall be appreciated that changes or modifications of these embodiments may be achieved without departing from the scope of the invention as defined by the claims appended hereto.

What is claimed is:

1. A solar panel array comprising:
a solar panel support structure spaced from the ground at a desired height; at least one single axis tracker mounted to said support structure, said single axis tracker including a roller for selectively displacing said single axis tracker horizontally across said solar panel support structure;

said solar panel structure including a horizontally extending cable upon which said roller is mounted so that said roller directly contacts said cable and when said single axis tracker is displaced horizontally across said solar panel structure, a weight of the at least one single axis tracker is applied to said cable by said roller;

said at least one single axis tracker having a plurality of solar panel mounted thereto;

said at least one single axis tracker further including a base, a bearing assembly mounted to said base, and a motor assembly for causing rotation of said plurality of solar panels about a center axis thereof;

wherein the motor assembly is mounted between rocker supports and the motor assembly has a motor shaft that extends beyond opposite ends of the motor housing; and wherein respective solar panels of said plurality of solar panels are secured to each end of the motor shaft; and at least a pair of columns for supporting the solar panel support structure to the ground.

2. The solar panel array of claim 1 further including:

a control module communicating with said motor assembly for selective control of the position of said plurality of solar panels.

3. A solar panel array comprising:

a solar panel support structure spaced from the ground at a desired height; at least one single axis tracker mounted to said support structure, said single axis tracker including (a) a roller for selectively displacing said single axis tracker horizontally across said solar panel support structure (b) a motor assembly having a motor shaft (c) a base; and (d) a bearing assembly mounted to said base enabling the motor assembly to rotate the motor shaft about a center axis thereof;

said solar panel structure including a horizontally extending cable upon which said roller is mounted for the selective horizontal displacement of said single axis tracker;

wherein the motor shaft of the motor assembly extends beyond opposite ends of the motor assembly; and wherein respective solar panels of a plurality of solar panels are secured to each end of the motor shaft;

at least a pair of columns for supporting the solar panel support structure to the ground; and wherein said motor assembly causes rotation of said motor shaft which in turn causes rotation of said plurality of solar panels.

4. The solar panel array of claim 3 further including:

a control module communicating with said motor assembly for selective control of the position of said plurality of solar panels.

* * * * *